United States Patent [19]

Ostrom et al.

[11] Patent Number: 5,410,317
[45] Date of Patent: Apr. 25, 1995

[54] TERRAIN CLEARANCE GENERATOR

[75] Inventors: Gary A. Ostrom, Bellevue; Scott R. Gremmert, Duvall, both of Wash.

[73] Assignee: AlliedSignal Inc., Morris Township, Morris County, N.J.

[21] Appl. No.: 43,410

[22] Filed: Apr. 6, 1993

[51] Int. Cl.$^6$ ............................................. G01S 13/94
[52] U.S. Cl. ....................... 342/65; 342/120; 342/121
[58] Field of Search ......................... 342/65, 120, 121

[56] References Cited

U.S. PATENT DOCUMENTS

| | | | |
|---|---|---|---|
| 3,716,860 | 2/1973 | Bechtel | 342/33 |
| 3,786,505 | 1/1974 | Rennie | 342/33 |
| 4,433,323 | 2/1984 | Grove | 340/970 |
| 4,567,483 | 1/1986 | Bateman et al. | 340/970 |
| 4,646,244 | 2/1987 | Bateman et al. | 364/461 |
| 4,675,823 | 6/1987 | Noland | 342/65 X |
| 4,829,304 | 5/1989 | Baird | 342/63 |
| 4,924,401 | 5/1990 | Bice et al. | 364/433 |
| 4,939,513 | 7/1990 | Paterson et al. | 342/65 X |
| 4,987,413 | 1/1991 | Grove | 340/970 |
| 5,196,847 | 3/1993 | Bateman | 340/970 |
| 5,272,639 | 12/1993 | McGuffin | 342/64 X |

Primary Examiner—John B. Sotomayor
Attorney, Agent, or Firm—Howard G. Massung

[57] ABSTRACT

A terrain clearance signal generator particularly usable with ground proximity warning systems provides a signal representative of terrain clearance when the radio altimeter signal is unreliable, such as in the case of excessive pitch or roll, out of track or other conditions resulting in invalid readings. The system monitors such conditions and takes a sample of the last valid radio altitude reading prior to sensing an invalid condition and, upon sensing an invalid condition, updates the sample utilizing barometric altitude signals or integrated barometric altitude rate or inertially-derived Z-velocity signals.

40 Claims, 2 Drawing Sheets

TERRAIN CLEARANCE GENERATOR

BACKGROUND OF THE INVENTION

1. Field of the Invention

This invention relates generally to aircraft terrain clearance systems and, more particularly, to a terrain clearance system particularly usable with a ground proximity warning system for providing a terrain clearance signal when the radio altimeter signal is unreliable or not valid.

2. Description of the Prior Art

Various terrain clearance systems are known including radio or radar altimeters. While such radio or radar altimeters generally do provide an accurate reading of terrain clearance, there are conditions where they do not. Among these conditions are a malfunction in the altimeter or an out of track condition where the aircraft ascends above the maximum operating altitude of the radio altimeter, usually 2500 or 5000 feet, and does not recover from the out of track condition when the aircraft descends again. Other inaccurate readings can occur during aircraft maneuvering during extreme pitch or roll angles where the radio altimeter signal is not being directed vertically toward the ground, but diagonally toward the terrain or even above the horizon. Under such conditions the radio altimeter reading will be higher than the actual terrain clearance and give the pilot a false sense of security when the aircraft is actually dangerously close to terrain.

To overcome some of these problems, attempts have been made to utilize a combination of radio altitude and barometric altitude signals in various proportions as a function of the altitude so that the barometric altitude signal predominates at higher altitudes and, the radio altitude signal predominates at lower altitudes. Other systems utilize the last valid radio altimeter signal to provide an altitude datum and integrate barometric altitude rate to obtain a change in altitude relative to that datum. Examples of such a systems are disclosed in U.S. Pat. No. 4,987,413 to Grove and in U.S. patent application Ser. No. 07/082,562 filed by Grove on Jul. 31, 1987. A system that discloses integrating barometric altitude to provide an altitude change is disclosed in U.S. Pat. No. 4,433,323 to Grove.

While such systems do provide a way of estimating terrain clearance when the radio altitude signal is unreliable, it is difficult to determine when the actual radio altitude signal should be utilized and how to determine that the radio altitude signal is unreliable and utilize the estimated or pseudo-altitude signal instead. It is also difficult to determine whether the pseudo altitude is valid and how long the pseudo altitude should remain engaged before its accuracy becomes questionable.

SUMMARY

Accordingly, it is an object of the present invention to provide a terrain clearance system that overcomes many disadvantages of the prior art systems.

It is another object of the present invention to provide a terrain clearance system that provides a terrain clearance signal that is particularly usable in conjunction with ground proximity warning systems.

It is yet another object of the present invention to provide a terrain clearance system that monitors various aircraft flight parameters to determine the reliability of the radio altitude signal.

It is yet another object of the present invention to provide a terrain clearance system that automatically switches a utilization device such as a ground proximity warning system from the radio altimeter signal to a computed pseudo-altitude signal when the radio altimeter signal is not reliable.

It is yet another object of the present invention to provide a pseudo-altitude signal to a utilization device such as a ground proximity warning system to reduce false warnings and to provide more accurate terrain clearance information to the utilization device when the radio altitude signal is not reliable.

Thus, according to a preferred embodiment of the invention, various flight parameters of the aircraft such as, for example, roll attitude or pitch attitude from a vertical gyro are monitored to determine whether the attitude of the aircraft is at an extreme. If the roll or pitch attitude exceeds a predetermined amount depending on aircraft type, for example, 30°–45° indicating that the radio altitude signal is inaccurate, a signal indicating that the radio altimeter reading is unreliable will be generated and a pseudo-altitude signal will be generated. Similarly, if the rate of change of radio altitude is excessive for the type of aircraft being flown indicating that the radio altimeter is slewing, or if an invalid signal is received from the radio altimeter, the pseudo-altitude signal will also be generated. The pseudo-altitude signal is generated by sampling the radio altitude signal periodically and storing the latest valid values of radio altitude. These values are then used as a datum plane from which to calculate the pseudo altitude. The pseudo altitude is calculated by monitoring barometric altitude or barometric altitude rate. When an accurate source of barometric altitude is available, any changes in barometric altitude are added to or subtracted from the datum radio altitude to provide a pseudo-altitude signal representing estimated current altitude. If the barometric altitude is not available, the barometric altitude rate is integrated to provide an altitude change signal that is referenced to the radio altitude datum to provide a pseudo-altitude signal representative of current altitude. The length of time that the pseudo-altitude signal is being generated is also monitored and if the time that the pseudo altitude is being utilized exceeds a predetermined amount of time indicating that it may no longer be reliable, the pseudo-altitude signal is terminated and a signal indicating that the pseudo-altitude signal is unreliable is generated. The length of time that the pseudo-altitude signal is considered to be reliable depends on the aircraft type and may vary between 20 and 120 seconds. In general, the pseudo altitude may be considered to be reliable for a longer period of time for an aircraft that flies over level terrain such as a Navy aircraft flying over water than for a land-based aircraft flying over undulating and particularly mountainous terrain.

BRIEF DESCRIPTION OF THE DRAWING

These and other objects and advantages of the present invention will become readily apparent upon consideration of the following detailed description and attached drawing, wherein.

DETAILED DESCRIPTION OF THE PREFERRED EMBODIMENT

Figure 1A:
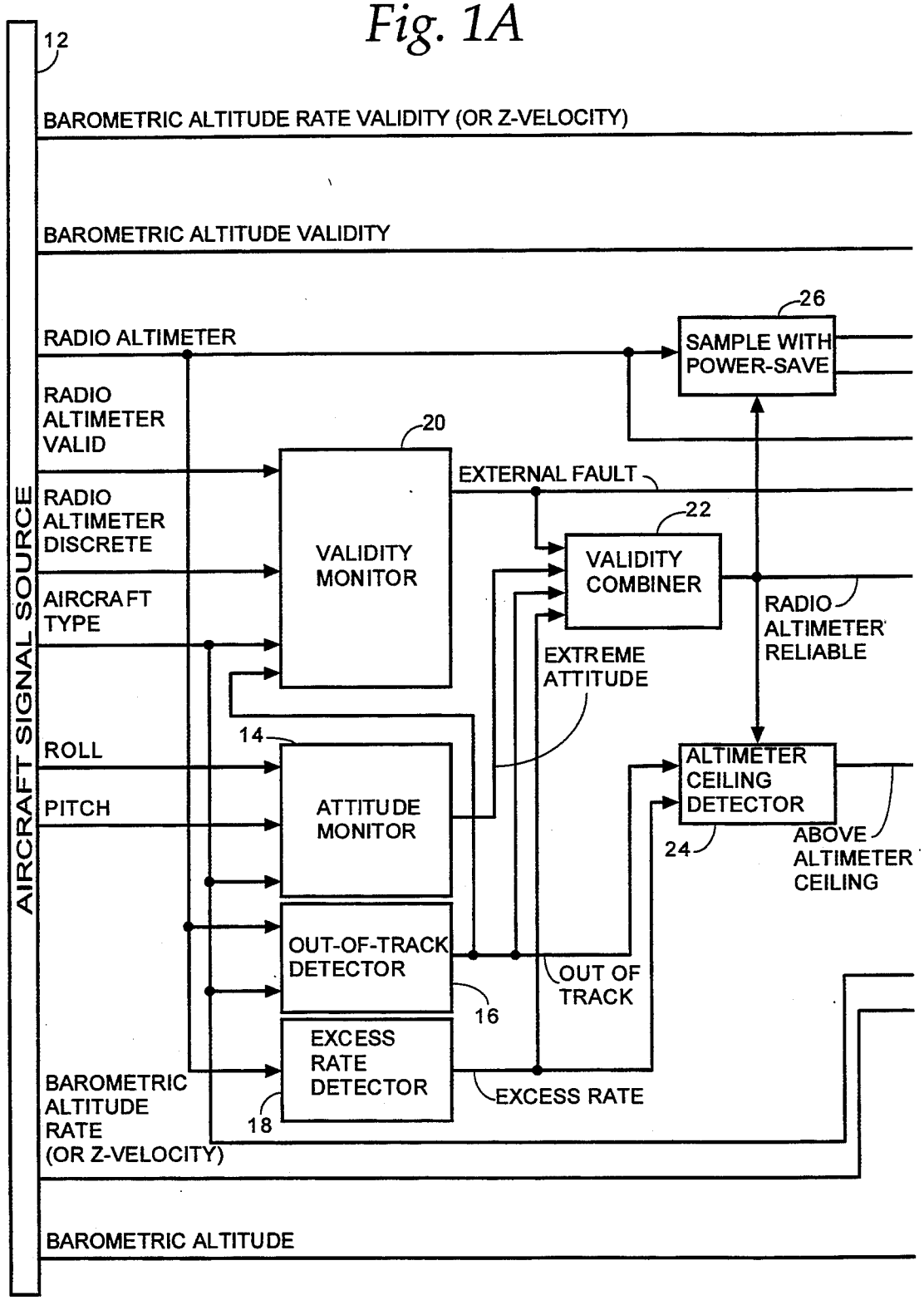
FIGS. 1A and 1B form a schematic block diagram of the terrain clearance generator in accordance with the present invention utilized in conjunction with a ground proximity warning system.
Figure 1B:
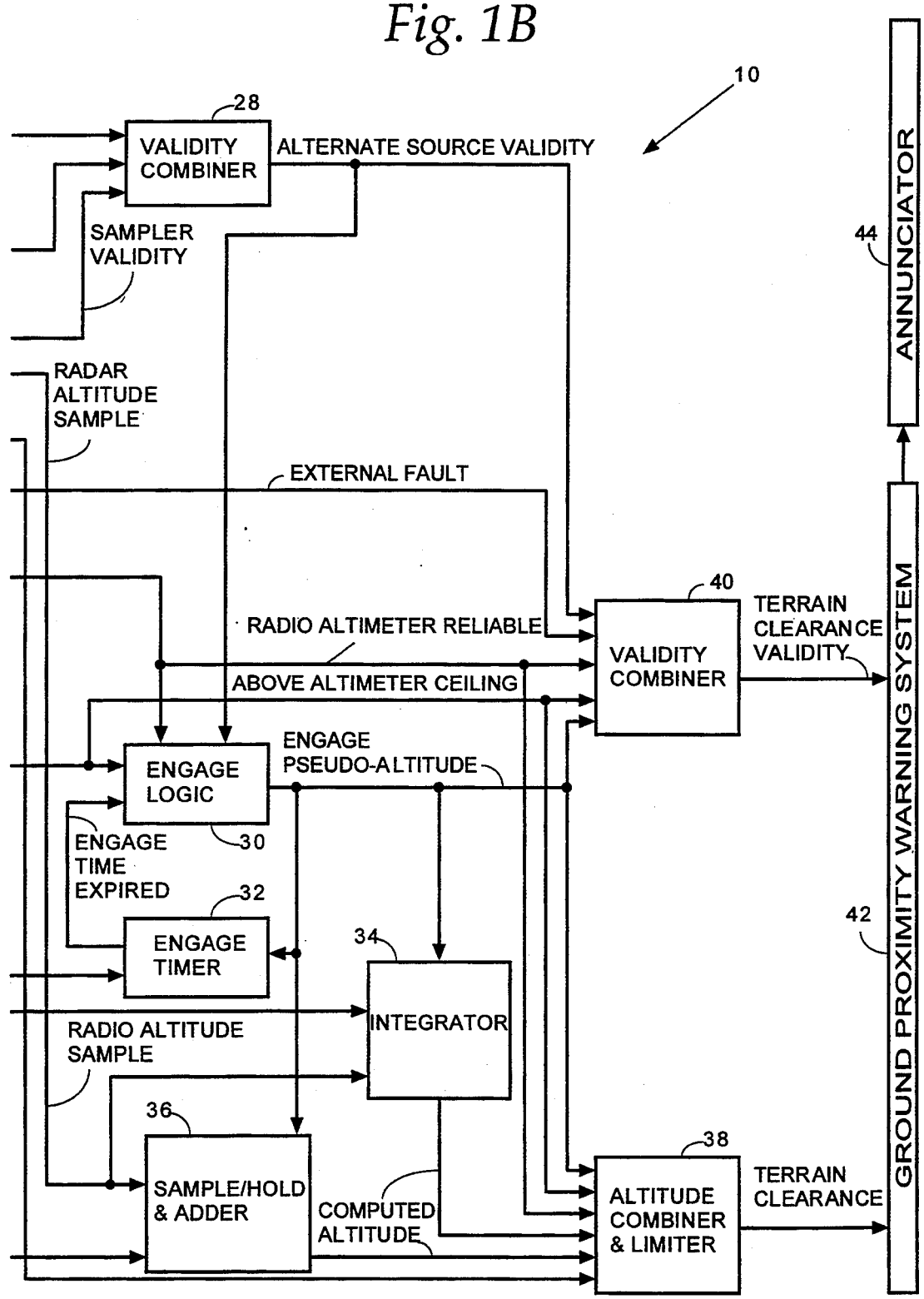

Referring now to the drawing with particular attention to FIGS. 1A and 1B, there is shown a block diagram of the terrain clearance system according to the invention, generally designated by the reference numeral 10. The system according to the invention utilizes signals available from the aircraft from individual instruments or, in the case of newer aircraft, from an aircraft data bus. As illustrated in FIG. 1A, an aircraft signal source 12 provides signals representative of radio or radar altitude, generally obtained from a radio altimeter, and a signal representative of whether the radio altimeter signal is valid or whether the radio altimeter is out of track. In addition, roll and pitch angles are obtained from the aircraft signal source from gyroscopes such as roll and pitch gyros. Signals representative of barometric altitude and barometric altitude rate are provided as is a signal representative of the validity of the barometric altitude and, consequently, the barometric altitude rate signal. Alternatively, the barometrically derived signals may be obtained inertially from an inertial navigation system that provides a Z-velocity signal that provides a measure of vertical speed of the aircraft as does the barometric altitude rate and may be used in conjunction with the present invention to provide a vertical velocity signal in place of the barometric altitude rate signal and may be integrated to provide an altitude signal. In addition, a discrete representative of the aircraft type is provided.

The system according to the invention utilizes an attitude monitor 14 that receives a signal representative of the aircraft type and signals representative of the roll and pitch attitude of the aircraft. Based on the roll and pitch angles and the aircraft type, the attitude monitor provides an extreme attitude signal when the roll or pitch attitudes, or a combination thereof, are excessive to provide an accurate indication of radio altitude for the type of aircraft being flown.

An out-of-track detector 16 monitors signals representative of the aircraft type and of the altitude above ground of the aircraft, i.e., radio altitude, and provides an out-of-track signal if the aircraft is above the maximum altitude range of the radio altimeter, which may range from 2450 feet to 5000 feet depending on the altimeter type, or has not resumed functioning properly after the aircraft has descended from a higher altitude to an altitude within the altitude range of the altimeter.

An excess rate detector 18 monitors the aircraft type discrete and radio altitude and provides an excessive rate signal if the rate of change of altitude is excessive for the type of aircraft being flown, indicating that the altimeter is slewing or a malfunction of the radio altimeter. In addition, faults in the radio altitude signal are monitored by a validity monitor 20 that monitors signals from the radio altimeter indicating whether the radio altimeter signal is valid, the aircraft type, a radio altimeter discrete signal that indicates whether the radio altimeter has been engaged and the out-of-track signal from the out-of-track detector 16. The signals from the out-of-track detector 16, the excess rate detector 18, the attitude monitor 14 and the validity monitor 20 are applied to a validity combiner 22 which monitors the various attitude, rate, validity and tracking signals to determine whether the radio altimeter signal is reliable.

An altimeter ceiling detector 24 monitors the output of the validity combiner 22, the out-of-track detector 16 and the excess rate detector 18 to determine whether the aircraft is flying above the operating ceiling of the radio altimeter and provides a signal indicating when it is above the altimeter ceiling. A sample and hold circuit 26 continuously samples the radio altitude signal and saves the last or the last several valid samples to provide an indication of the radio altitude at the time or times when the radio altitude was last considered to be reliable. A validity combiner 28 (FIG. 1B) monitors the barometric altitude rate or Z-velocity validity and the barometric altitude validity along with a sampler validity signal from the sampler 26 (FIG. 1A) to provide an alternate source validity signal indicating that the radio altitude sample from the sampler 26 is valid and the barometric rate or Z-velocity or barometric altitude signal are valid. An engage logic block 30 (FIG. 1B) receives the radio altimeter reliable signal from the validity combiner 22 (FIG. 1A), the above altimeter ceiling signal from the altimeter ceiling detector 24 and the alternate source validity signal from the validity combiner 28 (FIG. 1B) and selects either the radio altitude signal when the radio altimeter reading is reliable and the aircraft is below the ceiling of the radio altimeter and engages the pseudo-altitude system when the radio altimeter is not reliable or above its ceiling and the barometric altimeter or the barometric rate signal or Z-velocity signal is reliable. When the pseudo-altitude signal has been engaged, an engage timer 32 times how long the pseudo-altitude function has been engaged and terminates the pseudo-altitude function after a predetermined length of time. The predetermined length of time is a function of the aircraft type because different aircraft fly for longer periods with the pseudo altitude engaged, for example, aircraft flying over water can utilize the pseudo altitude for a relatively long period of time, for example, 120 seconds, whereas aircraft flying over undulating terrain require more frequent terrain clearance updates, for example, every 20 seconds, and cannot rely on the pseudo-altitude signal for an extended period of time.

An integrator 34 receives the barometric altitude rate or Z-velocity signal and the last or recent radio altitude sample and integrates the barometric altitude rate or Z-velocity and adds it to the radio altitude sample to provide a computed altitude or pseudo altitude. Alternatively, a sample and hold circuit and adder 36 receives the last or a recent radio altitude sample and adds or subtracts it to or from the current delta barometric altitude signal to provide a computed altitude above ground signal based on the last valid sample of radio altitude and current barometric altitude when a reliable source of barometric altitude is available. The outputs of the radio altimeter, the sample and hold and adder 36, the integrator 34, and enabling signals from the engage logic 30, the validity combiner 22 and the altimeter ceiling detector 24 are applied to an altitude combiner and limiter 38. The altitude combiner and limiter 38 receives the aforesaid signals and selects either the radio altimeter signal to provide a terrain clearance signal when the radio altitude signal is reliable or selects computed altitude signal from the integrator 34 or a computed altitude signal from the sample and hold and adder 36 when the radio altitude signal is not reliable or above its ceiling and the engage logic 30 determines that the pseudo altitude should be utilized. The and limiter 38 also limits the range of the altitudes of combiner signals provided at its output to a predetermined range, for example, zero to 30,000 feet. A validity combiner 40 monitors whether the radio altimeter signal is reliable and if the radio altimeter is above its ceiling and whether there is an external fault in the radio altitude signal. Based on this information, the validity combiner determines whether or not the terrain clearance signal from the radio altimeter is valid. The appropriate terrain clearance signal from the altitude combiner and limiter 38, which may be either the signal from the radio altimeter or the computed altitude from either the integrator 34 or the sample and hold and adder 36 are then applied to a ground warning system 42. The terrain clearance validity signal from the validity combiner 40 determines which, if any, of the terrain clearance signals are reliable and disables the ground proximity warning systems if all signals are unreliable or if the engage timer 32 has timed out. An annunciator 44 provides information to the pilot of any hazardous conditions sensed by the ground proximity warning system 42 and if the system is operating from signals from the radio altimeter or from pseudo altitude or if all altitude signals are invalid.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A terrain clearance signal generator for aircraft, comprising:
   means for receiving signals representative of radio altitude;
   means for receiving signals representative of barometrically derived altitude;
   means for receiving signals representative of the validity of the radio altitude signal; and
   means responsive to said radio altitude signal receiving means, said barometric altitude signal receiving means and said validity signal receiving means for providing a terrain clearance signal in response to said radio altitude signal when said radio altitude signal is valid and to a previously received valid radio altitude signal combined with the barometrically-derived altitude signal when the radio altitude signal is not valid.

2. A terrain clearance signal generator as recited in claim 1, wherein said validity signal receiving means includes means for receiving a signal representative of the attitude of the aircraft and is responsive to said attitude signal for providing an invalidity signal when the attitude exceeds a predetermined magnitude.

3. A terrain clearance signal generator as recited in claim 2, wherein said validity signal receiving means includes means for receiving a signal representative of the pitch angle of the aircraft and is responsive to said pitch angle signal for providing an invalidity signal when the pitch angle exceeds a predetermined magnitude.

4. A terrain clearance signal generator as recited in claim 2, wherein said validity signal receiving means includes means for receiving a signal representative of the roll angle of the aircraft and is responsive to said roll angle signal for providing an invalidity signal when the roll angle exceeds a predetermined magnitude.

5. A terrain clearance signal generator as recited in claim 1, wherein said validity signal receiving means includes means for receiving a signal representative of the tracking of the radio altimeter and is responsive to said tracking signal for providing an invalidity signal when the radio altimeter is out of track.

6. A terrain clearance signal generator as recited in claim 1, wherein said validity signal receiving means includes means for receiving a signal representative of the rate of change of radio altitude of the aircraft and is responsive to said rate of change of radio altitude signal for providing an invalidity signal when the rate of change of radio altitude exceeds a predetermined magnitude.

7. A terrain clearance signal generator as recited in claim 1, wherein said validity signal receiving means includes means for receiving a signal representative of the radio altitude of the aircraft and is responsive to said radio altitude signal for providing an invalidity signal when the radio altitude exceeds a predetermined magnitude.

8. A terrain clearance signal generator as recited in claim 1, further including means for determining the amount of time that the radio altitude signal has been invalid and preventing the terrain clearance signal from being generated when the radio altimeter signal has been invalid for more than a predetermined amount of time.

9. A terrain clearance signal generator as recited in claim 1, further including means for determining the validity of the barometric altitude signal and for preventing the terrain clearance signal from being generated when the barometric altimeter signal is not valid.

10. A terrain clearance signal generator as recited in claim 1, wherein said barometric altitude signal receiving means includes means for determining a change in barometric altitude that occurred subsequently to the last valid radio altitude and combining the barometric altitude change with the last valid radio altitude to provide the terrain clearance signal.

11. A terrain clearance signal generator as recited in claim 10, wherein said barometric altitude change determining means includes means for receiving and integrating a rate of change of barometric altitude signal.

12. A terrain clearance signal generator for aircraft, comprising:
   means for receiving signals representative of radio altitude;
   means for receiving signals representative of vertical velocity;
   means responsive to the vertical velocity signal receiving means for integrating said vertical velocity signals and providing an altitude change signal;
   means for receiving signals representative of the validity of the radio altitude signal; and
   means responsive to said radio altitude signal receiving means, said vertical velocity signal receiving means and said validity signal receiving means for providing a terrain clearance signal in response to said radio altitude signal when said radio altitude signal is valid and to a previously received valid radio altitude signal combined with the altitude change signal when the radio altitude signal is not valid.

13. A terrain clearance signal generator as recited in claim 12, wherein said validity signal receiving means includes means for receiving a signal representative of the attitude of the aircraft and is responsive to said attitude signal for providing an invalidity signal when the attitude exceeds a predetermined magnitude.

14. A terrain clearance signal generator as recited in claim 13, wherein said validity signal receiving means includes means for receiving a signal representative of the pitch angle of the aircraft and is responsive to said pitch angle signal for providing an invalidity signal when the pitch angle exceeds a predetermined magnitude.

15. A terrain clearance signal generator as recited in claim 13, wherein said validity signal receiving means includes means for receiving a signal representative of the roll angle of the aircraft and is responsive to said roll angle signal for providing an invalidity signal when the roll angle exceeds a predetermined magnitude.

16. A terrain clearance signal generator as recited in claim 12, wherein said validity signal receiving means includes means for receiving a signal representative of the tracking of the radio altimeter and is responsive to said tracking signal for providing an invalidity signal when the radio altimeter is out of track.

17. A terrain clearance signal generator as recited in claim 12, wherein said validity signal receiving means includes means for receiving a signal representative of the rate of change of radio altitude of the aircraft and is responsive to said rate of change of radio altitude signal for providing an invalidity signal when the rate of change of radio altitude exceeds a predetermined magnitude.

18. A terrain clearance signal generator as recited in claim 12, wherein said validity signal receiving means includes means for receiving a signal representative of the radio altitude of the aircraft and is responsive to said radio altitude signal for providing an invalidity signal when the radio altitude exceeds a predetermined magnitude.

19. A terrain clearance signal generator as recited in claim 12, further including means for determining the amount of time that the radio altitude signal has been invalid and preventing the terrain clearance signal from being generated when the radio altimeter signal has been invalid for more than a predetermined amount of time.

20. A terrain clearance signal generator as recited in claim 12, wherein said vertical velocity signal receiving means includes means for receiving a barometric altitude rate signal.

21. A terrain clearance signal generator as recited in claim 12, wherein said vertical velocity signal receiving means includes means for receiving an inertially derived vertical velocity signal.

22. A method for providing a terrain clearance signal for aircraft, comprising:
receiving signals representative of radio altitude;
receiving signals representative of barometrically derived altitude;
receiving signals representative of the validity of the radio altitude signal; and
monitoring said radio altitude signal, said barometric altitude signal and said validity signal and providing a terrain clearance signal in response to said radio altitude signal when said radio altitude signal is valid and to a previously received valid radio altitude signal combined with a barometrically-derived altitude signal when the radio altitude signal is not valid.

23. The method recited in claim 22, wherein said validity signal is generated by receiving a signal representative of the attitude of the aircraft and providing an invalidity signal when the attitude exceeds a predetermined magnitude.

24. The method recited in claim 23, wherein said validity signal receiving a signal representative of the pitch angle of the aircraft and providing an invalidity signal when the pitch angle exceeds a predetermined magnitude.

25. The method recited in claim 23, wherein said validity signal is generated by receiving a signal representative of the roll angle of the aircraft and providing an invalidity signal when the roll angle exceeds a predetermined magnitude.

26. The method recited in claim 22, wherein said validity signal is generated by receiving a signal representative of the tracking of the radio altimeter and providing an invalidity signal when the radio altimeter is out of track.

27. The method recited in claim 22, wherein said validity signal is generated by receiving a signal representative of the rate of change of radio altitude of the aircraft and providing an invalidity signal when the rate of change of radio altitude exceeds a predetermined magnitude.

28. The method recited in claim 22, wherein said validity signal is generated by receiving a signal representative of the radio altitude of the aircraft providing an invalidity signal when the radio altitude exceeds a predetermined magnitude.

29. The method recited in claim 22, further including monitoring the amount of time that the radio altitude signal has been invalid and preventing the terrain clearance signal from being generated when the radio altimeter signal has been invalid for more than a predetermined amount of time.

30. The method recited in claim 22, further including determining the validity of the barometric altitude signal and preventing the terrain clearance signal from being generated when the barometric altimeter signal is not valid.

31. The method recited in claim 22, further including determining a change in barometric altitude that occurred subsequently to the last valid radio altitude and combining the barometric altitude change with the last valid radio altitude to provide the terrain clearance signal.

32. The method recited in claim 31, wherein said barometric altitude change is determined by receiving and integrating a rate of change of barometric altitude signal.

33. A method for providing a terrain clearance signal for aircraft, comprising:
receiving signals representative of radio altitude;
receiving signals representative of vertical velocity;
receiving signals representative of the validity of the radio altitude signal; and
monitoring said radio altitude signal, said vertical velocity signal and said validity signal and providing a terrain clearance signal in response to said radio altitude signal when said radio altitude signal is valid and to a previously received valid radio altitude signal combined with the altitude change signal when the radio altitude signal is not valid.

34. The method recited in claim 33, wherein said validity signal is generated by receiving a signal representative of the attitude of the aircraft and providing an invalidity signal when the attitude exceeds a predetermined magnitude.

35. The method recited in claim 34, wherein said validity signal is generated by receiving a signal representative of the pitch angle of the aircraft and providing an invalidity signal when the pitch angle exceeds a predetermined magnitude.

36. The method recited in claim 34, wherein said validity signal is generated by receiving a signal representative of the roll angle of the aircraft and providing an invalidity signal when the roll angle exceeds a predetermined magnitude.

37. The method recited in claim 33, wherein said validity signal is generated by receiving a signal representative of the tracking of the radio altimeter and is responsive to said tracking signal for providing an invalidity signal when the radio altimeter is out of track.

38. The method recited in claim 33, wherein said validity signal is generated by receiving a signal representative of the rate of change of radio altitude of the aircraft and providing an invalidity signal when the rate of change of radio altitude exceeds a predetermined magnitude.

39. The method recited in claim 33, wherein said validity signal is generated by receiving a signal representative of the radio altitude of the aircraft and providing an invalidity signal when the radio altitude exceeds a predetermined magnitude.

40. The method recited in claim 33, further including monitoring the amount of time that the radio altitude signal has been invalid and preventing the terrain clearance signal from being generated when he radio altimeter signal has been invalid for more than a predetermined amount of time.

* * * * *